United States Patent [19]

Prem et al.

[11] 4,244,852

[45] Jan. 13, 1981

[54] RUBBER-MODIFIED HIGH NITRILE COPOLYMERS WITH IMPROVED IMPACT RESISTANCE

[75] Inventors: Dorothy C. Prem, Sagamore Hills; June T. Duke, Chagrin Falls; Ralph E. Isley, Northfield, all of Ohio

[73] Assignee: The Standard Oil Company, Cleveland, Ohio

[21] Appl. No.: 968,937

[22] Filed: Nov. 16, 1978

[51] Int. Cl.$^3$ .............................................. C08K 5/12
[52] U.S. Cl. ........................................ 260/31.8 AN
[58] Field of Search .................. 260/31.4 R, 31.8 M, 260/31.8 DR, 31.8 AN, 879, 880 R

[56] References Cited

U.S. PATENT DOCUMENTS

| | | | |
|---|---|---|---|
| 2,325,946 | 8/1943 | Garvey | 260/31.8 DR |
| 2,380,184 | 7/1945 | Marple | 260/31.8 DR |
| 2,479,018 | 8/1949 | Nicholl | 260/31.8 DR |
| 2,498,532 | 2/1950 | Dean | 260/31.8 DR |
| 3,284,396 | 11/1966 | Talalay | 260/29.7 R |
| 3,535,251 | 10/1970 | Brenschede | 260/31.8 AN |
| 3,725,332 | 4/1973 | Carrock | 260/31.8 DR |
| 3,893,966 | 7/1975 | Stein | 260/31.8 AN |
| 4,000,106 | 12/1976 | Isley | 260/31.8 DR |
| 4,102,947 | 7/1978 | Budinger | 260/879 |

*Primary Examiner*—Paul R. Michl
*Attorney, Agent, or Firm*—William D. Mooney; Herbert D. Knudsen; Larry W. Evans

[57] ABSTRACT

The inclusion of a small amount of an ester-type plasticizer in the rubber polymerization recipe in the production of rubber-modified high nitrile copolymer resins produces resins having markedly improved impact resistance at both low and high temperatures.

7 Claims, No Drawings

RUBBER-MODIFIED HIGH NITRILE COPOLYMERS WITH IMPROVED IMPACT RESISTANCE

This invention relates to rubber-modified high nitrile copolymers having improved impact resistance, and more particularly pertains to a process for preparing such copolymers comprising including a plasticizer in the rubber polymerization recipe.

We have discovered that the inclusion of a small amount of an ester-type plasticizer in the rubber polymerization recipe in the production of rubber-modified high nitrile copolymer resins produces resins having improved impact strength both at low and high temperatures. Surprisingly, the process of this invention produces resins having impact strengths which are superior to those of similar resins in which the plasticizer is added either during the resin polymerization stage or after the resin has been produced.

Rubber-modified high nitrile copolymers useful in this invention are those which result from the polymerization of a major proportion of an olefinically unsaturated nitrile, another monomer component copolymerizable therewith, and a preformed rubber. The ester plasticizer is present in the preformed rubber by virtue of its having been included in the rubber polymerization recipe.

The rubber-modified high nitrile copolymers of this invention can be prepared by any of the known general techniques of polymerization including the bulk polymerization, solution polymerization and emulsion or suspension polymerization techniques, by batch, continuous or intermittent addition of the monomers and other components. The preferred method is emulsion or suspension polymerization in an aqueous medium. The polymerization is preferably carried out in an aqueous medium in the presence of an emulsifier or a suspending agent and a free-radical generating polymerization initiator at a temperature of from about 0° to 100° C. in the substantial absence of molecular oxygen.

Polymers useful in the process of this invention include those produced by polymerizing a major proportion of a monounsaturated nitrile, such as acrylonitrile, and a minor proportion of another monovinyl monomer copolymerizable with said nitrile in an aqueous medium in the presence of a plasticizer-containing preformed diene rubber which may be a homopolymer or a copolymer of a conjugated diene monomer.

The conjugated diene monomers useful in the present invention include butadiene-1,3, isoprene, chloroprene, bromoprene, cyanoprene, 2,3-dimethyl butadiene-1,3, 2-ethyl butadiene-1,3, 2,3-diethyl butadiene-1,3, and the like. Most preferred for the purposes of this invention are butadiene-1,3 and isoprene because of their ready availability and their excellent polymerization characteristics.

The olefinically unsaturated nitriles useful in the present invention are the alpha,beta-olefinically unsaturated mononitriles having the structure

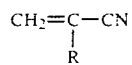

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile, and mixtures thereof.

The other monovinyl monomer component copolymerizable with the olefinically unsaturated nitriles includes one or more of the esters of olefinically unsaturated carboxylic acids, vinyl esters, vinyl ethers, alpha-olefins, vinyl aromatic monomers, indene, and the like.

The esters of olefinically unsaturated carboxylic acids include those having the structure

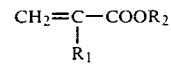

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. Most preferred in this invention are methyl acrylate, ethyl acrylate, methyl methacrylate, and ethyl methacrylate.

The alpha-olefins useful in this invention are those having at least 4 and as many as 10 carbon atoms having the structure

wherein R' and R" are alkyl groups having from 1 to 7 carbon atoms, and more specifically isobutylene, 2-methyl butene-1, 2-methyl pentene-1, 2-methyl hexene-1, 2-methyl heptene-1, 2-methyl octene-1, 2-ethyl butene-1, 2-propyl butene-1, and the like. Most preferred is isobutylene.

The vinyl ethers include methyl vinyl ether, ethyl vinyl ether, the propyl vinyl ethers, the butyl vinyl ethers, methyl isopropenyl ether, ethyl isopropenyl ether, and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates, and the like. Most preferred is vinyl acetate.

The vinyl aromatic monomers include styrene, alpha-methyl styrene, the vinyl toluenes, the vinyl xylenes, and the like. Most preferred is styrene.

Specific polymers useful in this invention are those prepared by the polymerization of 100 parts by weight of (A) from 60 to 90% by weight of at least one nitrile having the structure

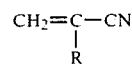

wherein R has the foregoing designation and (B) from 10 to 40% by weight based on the combined weights of (A) and (B) of at least one member selected from the group consisting of (1) an ester having the structure $$CH_2=C-COOR_2$$
$$\phantom{CH_2=}|$$
$$\phantom{CH_2=}R_1$$

wherein $R_1$ and $R_2$ have the foregoing designations, (2) an alpha-olefin having the structure $$\phantom{CH_2=}R'$$
$$\phantom{CH_2=}|$$
$$CH_2=C$$
$$\phantom{CH_2=}|$$
$$\phantom{CH_2=}R''$$

wherein $R'$ and $R''$ have the foregoing designations, (3) a vinyl ether selected from the group consisting of methyl vinyl ether, ethyl vinyl ether, the propyl vinyl ethers, and the butyl vinyl ethers, (4) vinyl acetate, (5) styrene, and (6) indene, in the presence of from 1 to 40 parts by weight of (C) a rubbery polymer of a conjugated diene monomer selected from the group consisting of butadiene and isoprene and optionally a comonomer selected from the group consisting of styrene, a nitrile monomer having the structure $$CH_2=C-CN$$
$$\phantom{CH_2=}|$$
$$\phantom{CH_2=}R$$

wherein R has the foregoing designation, and an ester having the structure $$CH_2=C-COOR_2$$
$$\phantom{CH_2=}|$$
$$\phantom{CH_2=}R_1$$

wherein $R_1$ and $R_2$ have the foregoing designations, said rubbery polymer containing from 50 to 100% by weight of polymerized conjugated diene and from 0 to 50% by weight of polymerized comonomer, said (C) having been prepared by carrying out the polymerization of the monomers in the presence of from 5 to 50 parts by weight per 100 parts of monomer of a plasticizer having the structure $R^{III}$–(COOR$^{IV}$)$_2$ wherein $R^{III}$ is an aliphatic hydrocarbon diradical having from 1 to 12 carbon atoms or an aromatic hydrocarbon diradical having from 6 to 12 carbon atoms, and $R^{IV}$ is an aliphatic hydrocarbon group having from 1 to 12 carbon atoms or an aliphatic hydrocarbon ether group having from 2 to 12 carbon atoms. Specifically preferred plasticizers of this type include dioctyl phthalate, di-2-ethyl hexyl phthalate, dioctyl adipate, di-2-ethyl hexyl adipate, didecyl adipate, dibutoxy ethyl adipate, dihexyl azelate, di-2-ethyl hexyl azelate, dioctyl sebacate, di-2-ethyl hexyl sebacate, dioctyl terphthalate, di-2-ethyl hexyl terphthalate, di-isopropoxyethoxymethyl glutarate, di-isodecyl glutarate, and mixtures thereof, and the like.

The polymeric products of this invention are thermoplastic materials which can be thermoformed into a wide variety of useful articles in any of the conventional ways employed with known thermoplastic polymeric materials, such as by extrusion, milling, molding, drawing, blowing, etc. The polymeric products of this invention have excellent solvent resistance and their impact strength makes them useful in the construction and packaging industries.

In the following illustrative examples, the amounts of ingredients are expressed in parts by weight unless otherwise specified.

EXAMPLE 1

A. Rubber latexes were prepared from the following ingredients:

| Ingredient | Parts |
|---|---|
| butadiene | 70 |
| acrylonitrile | 30 |
| azobisisobutyronitrile | 0.40 |
| t-dodecyl mercaptan | 0.65 |
| S. F. flakes (soap) | 1.40 |
| water | 200 |
| di-2-ethyl hexyl adipate | variable |

Before polymerization, the pH of the mixture was adjusted to about 8 with KOH. The polymerization was carried out with continuous agitation at 45° C. in the substantial absence of oxygen for about 4 hours.

B. Resins were prepared using the following ingredients:

| Ingredient | Parts |
|---|---|
| acrylonitrile | 75 |
| methyl acrylate | 25 |
| potassium persulfate | 0.06 |
| n-dodecyl mercaptan | 1.50 |
| PVP K-90 (polyvinyl pyrollidone) | 0.30 |
| dioctyl sodium sulfosuccinate | 0.85 |
| water | 230 |
| latex from A above (rubber solids basis) | 10.34 |

The polymerization was carried out in the substantial absence of oxygen at 60° C. for 20 hours to produce a latex. The resin was isolated from the latex by coagulation with dilute aqueous aluminum sulfate. The resin was washed free of alum with water and was dried.

EXAMPLE 2

The resins from Example 1A and 1B were molded into test bars and the notched Izod impact was determined at 73° F. and at 0° F. The following table gives the results of these determinations.

TABLE

| Parts Di-2-Ethyl Hexyl Adipate in Rubber (Example 1A) | Notched Izod Impact Strength (foot pounds per inch of notch) | |
|---|---|---|
| | 73° F. | 0° F. |
| none (control) | 2.46 | 0.92 |
| 30 | 13.7 | 3.60 |
| 20 | 14.1 | 2.80 |
| 10 | 12.6 | 1.44 |

EXAMPLE 3

The procedures of Example 1A and 1B were repeated except that 3 parts of di-2-ethyl hexyl adipate were added as an ingredient in the Example 1B polymerization and none was added as an ingredient in the Example 1A polymerization. Test bars of the final resin which is outside the scope of the present invention were found to have notched Izod impact strengths of 2.99 foot pounds per inch of notch at 73° F. and 1.45 at 0° F.

Example 4

One hundred parts of resin containing no added di-2-ethyl hexyl adipate ("control" in Example 2) were compounded on a differential roll mill with 3 parts of di-2-ethyl hexyl adipate to produce a physical mixture which is outside the scope of this invention. Test bars made from this mixture of resin and plasticizer were found to have notched Izod impact strengths at 73° F. of 4.52 foot pounds per inch of notch and at 0° F. of 1.66 foot pounds per inch of notch.

We claim:

1. The process for preparing a resin having good impact resistance comprising polymerization in an agueous medium at a temperture in the range of from 0° to 100° C. in the substantial absence of molecular oxygen 100 parts by weight of (A) from 60 to 90% by weight of at least one nitrile having the structure $$CH_2=C-CN$$
$$\phantom{CH_2=}|$$
$$\phantom{CH_2=}R$$

wherein R is hydrogen, a lower alkyl group having from 1 to 4 carbon atoms, or a halogen, and (B) from 10 to 40% by weight based on the combined weights of (A) and (B) of at least one member selected from the group consisting of (1) an ester having the structure $$CH_2=C-COOR_2$$
$$\phantom{CH_2=}|$$
$$\phantom{CH_2=}R_1$$

wherein $R_1$ is hydrogen, an alkyl group having from 1 to 4 carbon atoms, or a halogen, and $R_2$ is an alkyl group having from 1 to 6 carbon atoms, (2) an alpha-olefin having the structure $$\phantom{CH_2=}R'$$
$$\phantom{CH_2=}|$$
$$CH_2=C$$
$$\phantom{CH_2=}|$$
$$\phantom{CH_2=}R''$$

wherein R' and R'' are alkyl groups having from 1 to 7 carbon atoms, (3) a vinyl ether selected from the group consisting of methyl vinyl ether, ethyl vinyl ether, the propyl vinyl ethers, and the butyl vinyl ethers, (4) vinyl acetate, (5) styrene, and (6) indene, in the presence of from 1 to 40 parts by weight of (C) a rubbery polymer of a conjugated diene monomer selected from the group consisting of butadiene and isoprene and optionally a comonomer selected from the group consisting of styrene, a nitrile monomer having the structure $$CH_2=C-CN$$
$$\phantom{CH_2=}|$$
$$\phantom{CH_2=}R$$

wherein R has the foregoing designation, and an ester having the structure $$CH_2=C-COOR_2$$
$$\phantom{CH_2=}|$$
$$\phantom{CH_2=}R_1$$

wherein $R_1$ and $R_2$ have the foregoing designations, said rubbery polymer containing from 50 to 100% by weight of polymerized conjugated diene and from 0 to 50% by weight of polymerized comonomer, said (C) having been prepared by carrying out the polymerization of the monomers in the presence of from 5 to 50 parts by weight per 100 parts of monomer of at least one plasticizer selected from the group consisting of dioctyl phthalate, di-2-ethyl hexyl phthalate, dioctyl adipate, di-2-ethyl hexyl adipate, didecyl adipate, dibutoxy ethyl adipate, dihexyl azelate, di-2-ethyl hexyl azelate, dioctyl sebacate, di-2-ethyl hexyl sebacate, dioctyl terphthalate, di-2-ethyl hexyl terphthalate, di-isopropoxyethoxymethyl glutarate, and di-isodecyl glutarate.

2. The process of claim 1 wherein (A) is acrylonitrile.

3. The process of claim 2 wherein (B) is methyl acrylate.

4. The process of claim 3 wherein (C) is a copolymer of butadiene and acrylonitrile.

5. The process of claim 2 wherein the plasticizer is di-2-ethyl hexyl adipate.

6. The process of claim 3 wherein the plasticizer is di-2-ethyl hexyl adipate.

7. The process of claim 4 wherein the plasticizer is di-2-ethyl hexyl adipate.

* * * * *